G. DUNHAM.
Nut Machine.

No. 231,956. Patented Sept. 7, 1880.

Fig. 1.

Witnesses,
John Edwards Jr
L. S. Burr

Inventor,
George Dunham
By James Shepard
Atty.

G. DUNHAM.
Nut Machine.

Patented Sept. 7, 1880.

Witnesses,
John Edwards Jr.
L S Burr

Inventor,
George Dunham
By James Shepard
Atty

G. DUNHAM.
Nut Machine.

No. 231,956.

Patented Sept. 7, 1880.

Witnesses,
John Edwards Jr
L. S. Burr

Inventor,
George Dunham
By James Shepard
Atty.

G. DUNHAM.
Nut Machine.

No. 231,956.  Patented Sept. 7, 1880.

Witnesses:
John Edwards Jr.
L. S. Burr

Inventor:
George Dunham
By James Shepard
Atty

G. DUNHAM.
Nut Machine.

No. 231,956. Patented Sept. 7, 1880.

Witnesses:
John Edwards Jr.
L. S. Burr

Inventor:
George Dunham
By James Shepard
Atty

G. DUNHAM.
Nut Machine.

No. 231,956. Patented Sept. 7, 1880.

Witnesses:
John Edwards Jr.
L. S. Burr

Inventor:
George Dunham
By James Shepard
Atty.

UNITED STATES PATENT OFFICE.

GEORGE DUNHAM, OF UNIONVILLE, CONNECTICUT, ASSIGNOR TO CHARLES C. DUNHAM, OF SAME PLACE.

NUT-MACHINE.

SPECIFICATION forming part of Letters Patent No. 231,956, dated September 7, 1880.

Application filed January 12, 1880.

*To all whom it may concern:*

Be it known that I, GEORGE DUNHAM, of Unionville, in the county of Hartford and State of Connecticut, have invented certain new and useful Improvements in Nut-Machines, of which the following is a specification.

In the accompanying drawings.

The principal novelty of my machine, aside from the combination of the parts, consists in the blanking out and transferring mechanisms.

Figure 1:
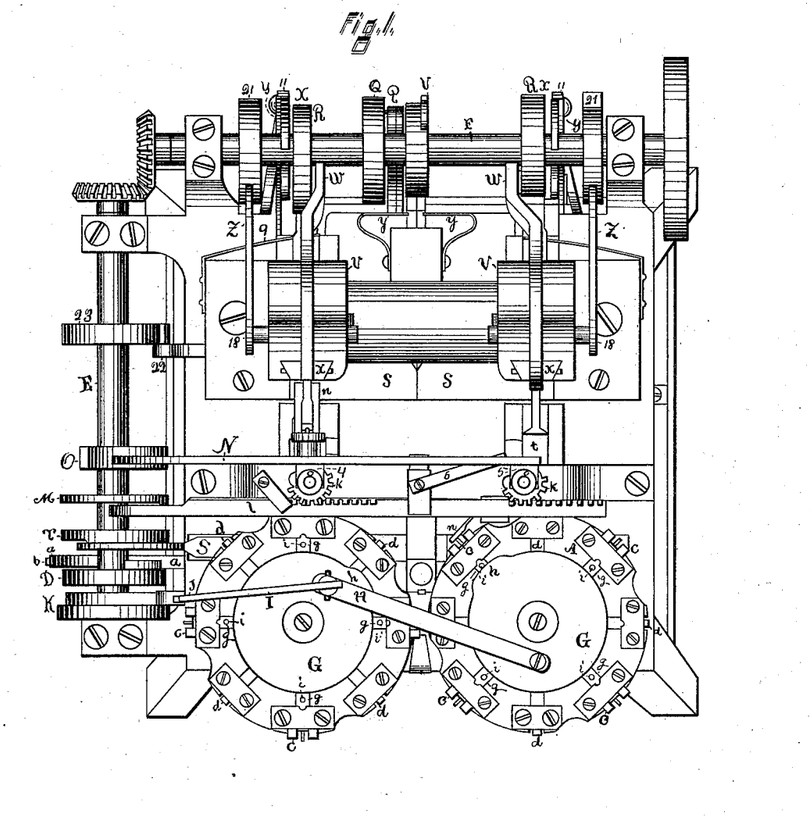
Figure 1 is a plan or top view of a machine which embodies my invention.

A A designate two intermittingly-rotating heads bearing blanking-out devices on their edges. These heads are set horizontally in the upper ends of two vertical shafts connected together by gears B B, Fig. 3, so as to move together. One of these shafts is provided with a ratchet-wheel, C, Figs. 3 and 4, by the side of which is a sliding bar, *a*, carrying a spring-pawl. (Shown by broken lines in Fig. 4.) The outer end of the bar *a* is curved, and engages the cam D, Figs. 4 and 1, to draw the bar and pawl in a direction to move the ratchet-wheel C, while the spring *b* returns said bar and pawl to their former position. The cam D is on the side shaft, E, which shaft receives its motion from the main shaft F, said shafts being connected by beveled gear, as shown by the plan view, Fig. 1. By this mechanism, and with eight teeth in the ratchet-wheel, an intermittent rotary movement is imparted to the heads A A, the same making one-eighth of a revolution at each intermittent movement.

In order to stop the heads A A and to prevent them from moving accidentally, their under sides are provided with as many holes (not shown) as they make fractional movements in one revolution, said holes forming the under side of the heads into division-plates.

Figure 18:
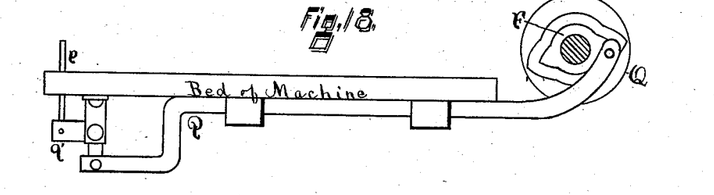
Fig. 18 is a side elevation of the mechanisms which operate the pins for locking the intermittingly-rotating heads in place during the action of the cutting-off punches.

In the bed of the machine there are two vertically-moving pins, $p\ p$, one for each head, and directly under the path of the holes in the heads. These pins are connected to one arm of an angle-lever, $q$, and to the other arm of said lever a sliding bar, P, is attached. This bar is reciprocated by means of a cam, Q, on shaft F, for a side elevation of which see Fig. 18. This cam is a grooved cam, so shaped as not only to reciprocate the bar P, but has two concentric portions, so as to hold the bar from reciprocation during parts of its revolution, and the cam is so set on the shaft with reference to the mechanism for moving the heads as to throw the pins $p\ p$ upward to engage the holes in the heads just as the pawl ceases to act on the ratchet-wheel C, and to withdraw said pins just before the heads begin to move again. Thus the heads are insured, by means of this locking mechanism against being accidentally moved under the operation of the blanking-out dies, hereinafter described. These heads are grooved radially at eight points equidistant from each other, and in these grooves there are dies $c$ and punches $d$, alternating each other, the punches being fitted to move longitudinally in said grooves, and held in place by any suitable caps, while the dies are secured rigidly to the heads. These dies and punches constitute the blanking-out shears or cutters. Inside or back of the dies $c$ there are slides $g$ working in radial grooves, and with a small rod or holding-punch on their front end, which protrudes between the cutting-edges of the dies. The dies are designed for cutting only on their vertical edges, and are left open at the top and bottom.

Figure 2:
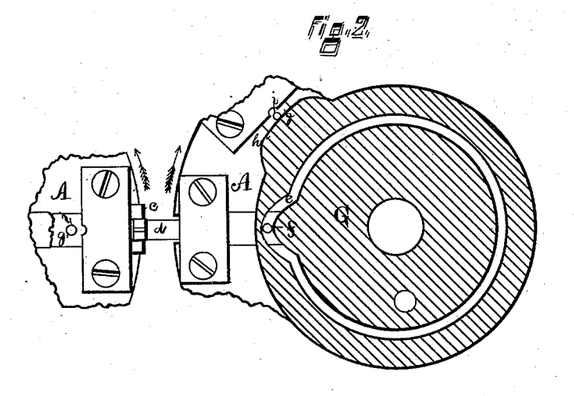
Fig. 2 is a detached plan view, partly in horizontal section, of the cutting-off dies and part of their operating mechanism.

Surrounding the heads A A there are oscillating caps G G, the same being grooved upon their under sides, as at $e$, Fig. 2, to form a double cam. The caps in said figure are represented with their scalp which connects the two walls of this double cam removed in order to better show the parts.

Each of the punches $d$ have an upward-projecting pin, $f$, Fig. 2, in their bodies, which pin rests in the groove $e$ of caps G G.

A peripheral projection on the caps G G forms the cam $h$, which engages the upward-projecting pins $i$ in the holding punches or slides $g$.

Figure 3:
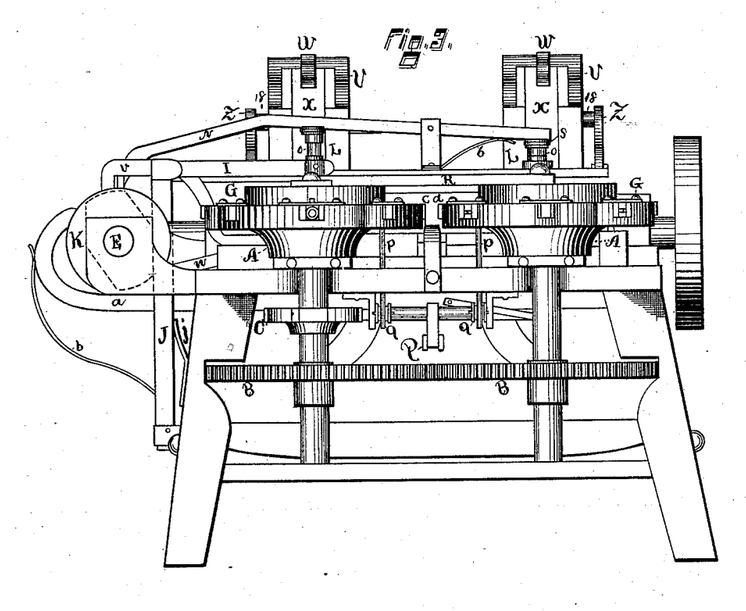
Fig. 3 is a front elevation of said machine.
Figure 4:
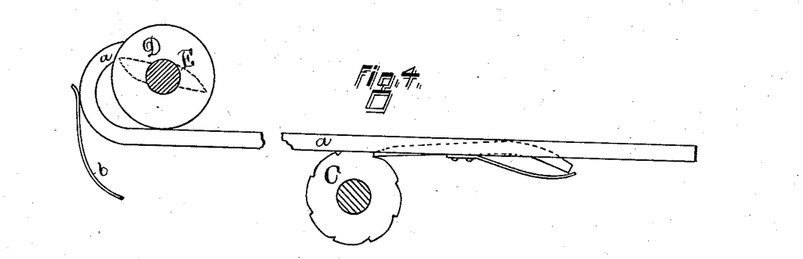
Fig. 4 is a view showing part of the mechanism for imparting an intermittingly-rotating motion to the heads which carry the blanking-out mechanism, the left-hand portion of said figure being a front view, and the right-hand portion a plan view, thereof.

The caps G G are connected together by means of pitman H, and one of said caps is connected to the jointed bars I J, the latter of which comes in contact with the cam K on the shaft E, the form of said cam being represented by broken lines in Fig. 3. A spring, $j$, Fig. 3, has a constant tendency to keep the bar J in contact with said cam.

A bar of metal, properly heated and of the proper width for the nuts desired to be produced, is placed between the cutting-dies and punches, the bar being governed in its position by suitable gages, which I deem unnecessary to describe.

When the heads A A are at rest the cam K, through bars J I and pitman H, imparts an oscillating movement to both caps G G. Previous to this movement of the caps the pins $f$ of the punches $d$ were all in the concentric portion of the groove $e$, and the pin of that punch then about to act was at the end of the concentric portion by the bottom of the cam proper. The movement imparted to the caps, as above described, is a little more than is sufficient to throw the pin, from the bottom of the cam to its point, into the position shown in Fig. 2, the inside wall of the groove being the active one. When the parts are in this position the end of the punch $d$ just enters the die $c$, and the end of the bar placed between said die and punch is thereby cut off. The bar may be so gaged that just enough will be sheared off to fill the die, or at least only a very thin shaving will be cut by the rear cutting-edge of the die. The blank thus cut off is crowded into the die $c$, and the holding-punch $g$ is left long enough so that its end will be, when forced inward to its greatest extent, a distance from the cutting-edges of the dies a little less than the thickness of the metal bar from which the blanks are cut. Therefore when a blank is forced into the die by the punch it is at the same time forced upon the end of the holding-punch $g$, so as to hold the blank in the die after the cutting-punch is withdrawn and prevent the accidental dropping of the blank.

The complete movement of the caps G G carries the point of the cam by the pin $f$ of the punch $d$, so as to just withdraw the punch from the mouth of the die. Then the next intermittent movement of the head begins by means of the pawl on bar $a$ engaging the next tooth of the ratchet-wheel C, and simultaneously with this movement the caps G G return to their former position and remain stationary while the motion of the head continues.

After the caps complete their return movement the heads, in completing their one-eighth of a revolution, force the pin $f$ of the punch $d$ against the outside wall of the cam-groove $e$, which causes the punch to move inward so that the pin enters the concentric portion of the groove, and the punch has no further longitudinal movement until it is again brought directly opposite its own die.

At the same time that the caps G G are moved to force the punch into its die the cam $h$ on the edge of said caps strikes the pin $i$ of the holding-punch belonging to the die which has just acted to cut a blank and forces said holding-punch outward, with its end about even with or a little outside of the cutting-corners of the said die, to eject the blank therefrom, when it is grasped by mechanism hereinafter described. These operations are repeated for every blank cut off, and inasmuch as in each head the dies and punches alternate it follows that the caps G G, although they both move together, only act alternately to project a punch and holder at each quarter-revolution of the head to which the caps are respectively attached, while their combined action is to cut off and throw out a blank for every eighth revolution of the heads, said blanks being discharged first from one head and next from the other, and so on repeatedly.

Figure 6:
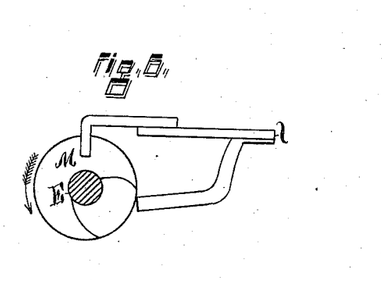
Fig. 6 is a front elevation of the parts which move the rack for swinging the conveying-tongs.

Back of the heads A A there are two vertical and hollow shafts, L L, mounted on a suitable frame, and provided with gears k k, which mesh into the reciprocating rack l. Said rack is reciprocated by means of cam M on shaft E, acting alternately upon the two arms of said rack. A detached front elevation of said parts M l is shown at the left in Fig. 6. The throw of the rack and the size of the gear on the hollow shafts L L are such that said shafts are rotated back and forth about one-third of a revolution. At the lower end of the hollow shaft L there is a transverse hollow shaft or arm, m. (Shown most clearly in the vertical section, Fig. 8.)

Figure 8:
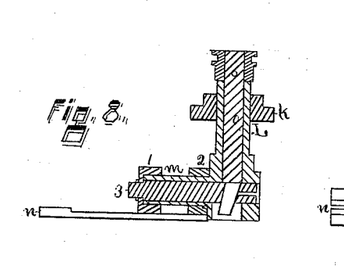
Fig. 8 is a vertical section of said tongs and part of their operating mechanism, taken through the axial line on which they swing.
Figure 9:
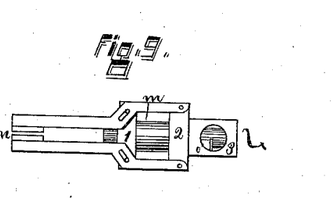
Fig. 9 is an under-side view of the same.
Figure 10:
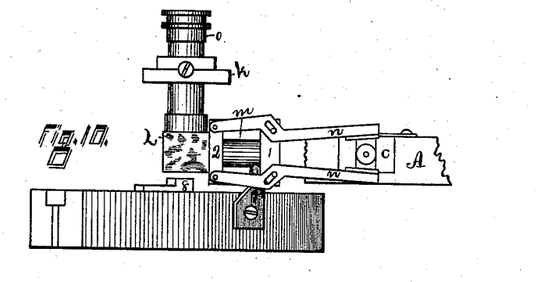
Fig. 10 is an elevation of the conveying-tongs, the same being viewed cornerwise with the main machine and with the conveyers presented to the cutting-off devices, showing the manner of turning the tongs from a horizontal to a vertical position.

The transferring or conveying tongs n are mounted, by means of semicircular blocks 1 2, on the arm m of hollow shaft L, the block 1 of which is cupped so as to fit the end of said shaft, as shown in Fig. 8. These blocks are fitted loosely to the arm m, so as to be free to turn thereon, and the block 2 is secured against longitudinal movement on the arm m. The tongs n are pivoted to the flat side or edge of block 2 and connected to the block 1 by means of pins resting in oblique slots in the arms of the tongs, as shown in Figs. 9 and 10. The block 1 is also pinned to the end of slide 3, Fig. 8, which extends through the hollow arm m. In the hollow shaft L there is a vertical slide, o, having an inclined tenon on its lower end, which passes through a mortise in the end of slide 3, (see Fig. 8,) whereby a reciprocating movement of the slide o moves the slide 3 back and forth, carrying the block 1 with it, when the pins in flat-sided edge of said block, working in the inclined slots in the arms of tongs n, operate to open and close said tongs. The upper ends of both vertical slides o o have an annular groove in them. (See Figs. 8, 10, and 11.)

Figure 7:
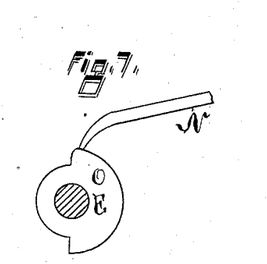
Fig. 7 is a front elevation of the cam and part of the lever for opening and closing said tongs.

Mounted on the main frame of the machine by a suitable standard there is a lever, N, having two lateral wings, 4 5, which engage the annular groove in the slides o o. (See Figs. 1 and 3.) Said lever is thrown in one direction by means of the spring 6, and in the opposite direction by means of the cam O on shaft E acting upon the end of lever N, as shown by the detached view, Fig. 7. When the right-hand pair of tongs n come to a point over the finishing mechanism, hereinafter described, the end of lever N drops off the shoulder of the cam O and opens this pair of tongs. At this time the other pair of tongs is presented to the nut-blank last ejected from the blanking-die and on the end of the holding-punch, and the parts are so combined that the dropping of the lever over the shoulder of the cam to open the right-hand pair of tongs acts to close the other pair. The next movement of the rack l turns the hollow shaft L about one-third of a revolution on its axis, and thereby swings the ends of the tongs from over the finishing mechanism to a point near the edge of the right-hand head A. When over the finishing mechanism the arms of the tongs lie flatwise in a horizontal position, but upon approaching the head which carries the blanking-out dies the edge of the advance arm of the tongs n comes in contact with the trip 7 (see Figs. 10 and 11) and prevents that edge from advancing farther; but as the arm to which the tongs are hung has not yet completed its swinging movement, the tongs and blocks 1 and 2 must necessarily turn on the arm m as it advances, whereby the tongs are tripped from a flat or horizontal position, as shown in Fig. 8, to an upright or vertical position, as shown in Figs. 9 and 10, thereby being presented, when open, to the blank at the mouth of the cutting-die. The parts heretofore described then operate to discharge the blank from the dies, and at about the same time the cam O trips the lever N again to close the tongs and cause them to grasp the blank as it comes out of the die on the end of the holding-punch. The rack l then moves to swing the tongs back again, when the lower arm of the tongs is tripped by the trip 8 (see Figs. 10 and 11) back into a horizontal position and over the finishing mechanism, the arm of the lever N remaining meanwhile on the largest concentric face of cam O; but as the tongs reach said point the lever drops off the shoulder of said cam and the tongs open to deposit the blank at the rear end of the movable anvil t, hereinafter described. Both pairs of tongs operate in like manner, only alternately. When one is opened the other one is closed, and when one is going toward the cutting-die of one head to receive a blank the other is carrying a blank away from the cutting-dies of the other head, and when one pair is in a horizontal position over the finishing mechanism the other pair is in a vertical position at the mouth of the blanking-die. After the blank leaves the tongs it is carried rearward a given distance, then swaged on its edges, the central hole punched, swaged flatwise, and discharged from the machine. There are two sets of mechanisms for thus operating upon the blank.

Figure 13:
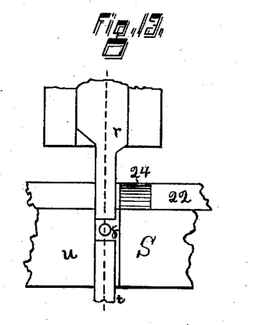
Fig. 13 is a detached plan view of the said hammers, &c., in their next successive position, which brings the nut-blank between the punching-die and punch for punching the central hole.
Figure 15:
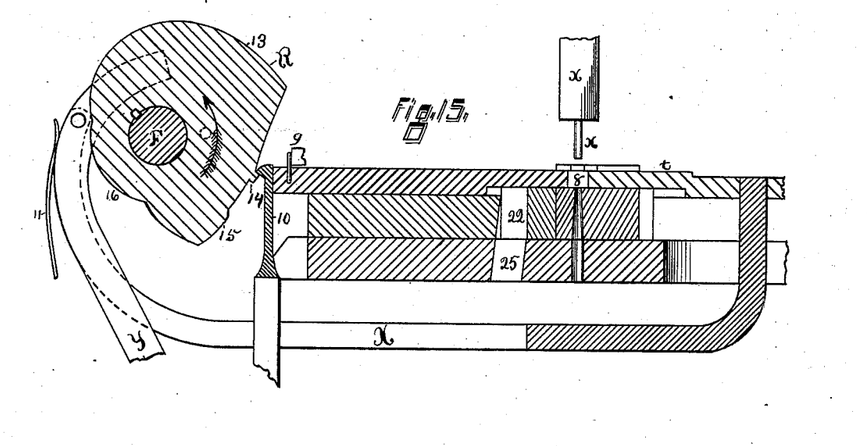
Fig. 15 is a vertical section of detached parts on line running from front to rear of the machine, as indicated by broken line in Fig. 13, and with the respective parts in the same position as in said figure.

Upon the bed of the machine, at the rear, there are two sliding hammers, r s, one stationary anvil, u, and one movable anvil, t, in each mechanism; and in the bed between the anvil $u$ and hammer $s$ there is a die, 8, Figs. 13 and 15, for cutting the central hole in the nut. The anvil $u$ and hammer $s$ are made wide from front to rear, so as to guide the blank in its course through them, while the hammer $r$ and movable anvil $t$ are of about the width of the nut operated upon.

Figure 12:
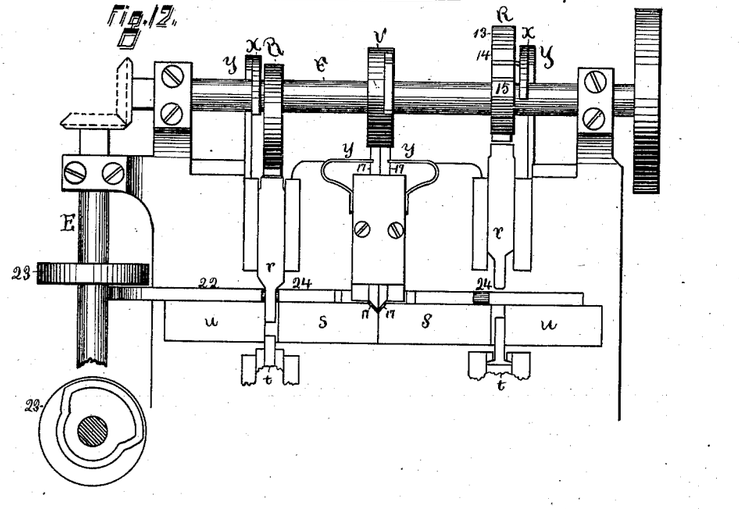
Fig. 12 is a detached top view of the finishing mechanism, the same being represented with the upper parts of the frame, vertically-moving hammer, and punch removed in order to better show the hammers which act upon the edges of the nuts, the parts on the left-hand side being represented in the proper position to receive a nut-blank from the conveying-tongs. Said figure also shows the cam at the left-hand side in front elevation as well as in plan views.

The nut-blank is dropped from the conveyer-tongs between said hammers and anvils, where they are in the position represented at the left-hand side in Fig. 12. The hammer $r$ is forced forward by the cam R on shaft F and backward by means of spring 9, Figs. 1 and 15. Between the cam R and end of hammer $r$ there is a swinging arm, 10, Fig. 15, to overcome the friction of said cam and prevent it from binding the hammer against its guides, the lower end of said swinging arm being hinged to the frame of the machine, which hinge is not shown.

The anvil $t$ is forced rearward by two different mechanisms and forward by means of spring 11, most clearly shown in Fig. 15. The front ends of the anvils $t$ $t$ extend forward to a point under the edges of the heads A A, and have one of their corners beveled off. A reciprocating bar, S, is arranged to slide transversely to the bed of the machine at the ends of these anvils $t$ $t$, which bar has notches with inclines 12 12, as shown by the detached plan view at the right hand of Fig. 5. At the left of the same figure the outer end of said bar, its two arms, $v$ $w$, and the cam T on shaft E, which acts against said arms to reciprocate the bar S, are shown in front elevation. This mechanism throws the anvil $t$ from the position shown in Fig. 12 rearward into the position represented in Figs. 13 and 15, the cam R in the meantime receding from the hammer $r$, so that said hammer is drawn rearward by its spring 9, and the nut-blank is thereby carried rearward between the hammer and anvil $r$ $t$, which have moved rearward simultaneously to bring the nut-blank over the die 8 and under the punch $x$.

Figure 5:
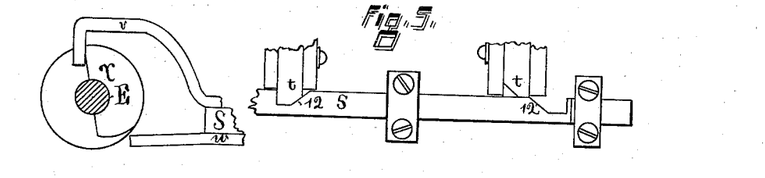
Fig. 5 is a like front elevation and plan view of parts for operating the movable anvils, which anvils also transfer the nut from point to point, as hereinafter described.

By reference to Fig. 5 it will be seen that when the inclines 12 on bar S have been carried by the ends of the anvil $t$ to force them rearward their ends abut squarely against the sides of said bar, as shown at the right-hand side of said figure, so that they are firmly held in position to act as anvils. When the bar S is thrown to the left then the left-hand anvil occupies the position therein shown for the right-hand one, and vice versa.

The cam R has three distinct projections, of which projection 13 acts to throw the hammer to its most forward position, after which it is allowed to fall back, and is then again thrown quickly forward and back by the projection 14, when a concentric face allows the hammer a short rest; then the third projection 15 throws it forward again and the following concentric face holds it there for a short period, after which the cam falls away; then there is a longer concentric portion, 16, from which rises the largest projection 13. (See Fig. 15.)

Figure 17:
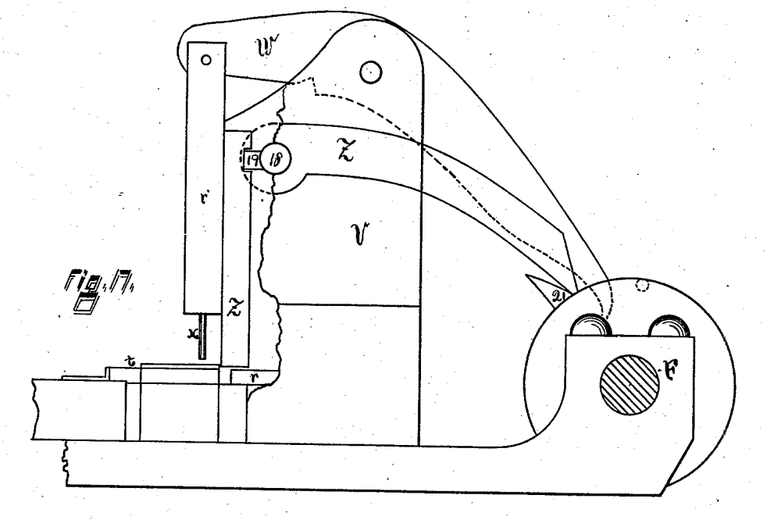
Fig. 17 is a side elevation of detached parts, the same being partially broken off, and showing the manner of operating the vertically-moving punch and swaging-hammer.

The side hammers, $s$ $s$, move transversely to the machine, and to avoid friction may be made to oscillate on a long arm or lever, (not shown,) and so hung that their own weight will throw them away from the anvils $u$ $u$. The meeting-corners of the hammers $s$ $s$ are beveled on the rear side, and just back of them are two wedges or slides, 17, guided in suitable ways and forced forward under the action of the cam U (which has separate projections for each slide) and backward by the springs $y$. When one of the wedges or slides 17 is thrown forward its point acts upon the hammer $s$ to throw it toward its anvil $u$. When the hammer $r$ and anvil $t$ have reached the position represented in Figs. 13 and 15, the first and smallest projection on cam U acts quickly to move the wedges 17 and hammer $s$, so as to compress the nut-blank edgewise between the anvil and said hammer, and the spring $y$ withdraws said hammer. The hammer $r$ is then given a quick blow forward and back by the projection 14 and spring 9, to hammer the other two edges of the nut, after which the second projection on cam U, having a concentric face, again moves up the side hammer, $s$. Next the projection 15 on cam R comes into play to move up the hammer $r$, and while both hammers are thus compressing the edge of the nut-blank the punch $x$ is caused to descend and punch a hole in the middle of the nut. The punch $x$ is mounted in a suitable frame, V, substantially like an ordinary lever-press, and to its upper end the lever W is connected. The other end of lever W extends rearward to one side of the cam R, in which is a pin, the position of which is indicated by the small broken circle in Fig. 17. Said pin acts upon the end of the lever W to lift it quickly, and thereby force its opposite end and the punch $x$ downward to cut the hole in the blank at the time before specified.

The mechanism which first moves the anvil $t$ backward has already been described, and is shown in Fig. 5.

Figure 11:
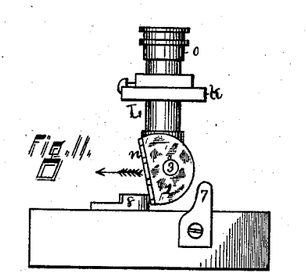
Fig. 11 is an end view of said tongs, showing the manner of turning them back to a horizontal position.
Figure 16:
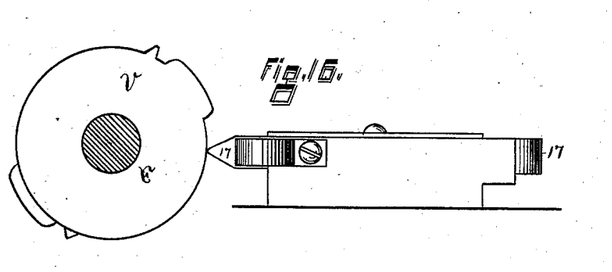
Fig. 16 is a detached side elevation of the cam and slide-wedges which operate the side hammers, the same being also shown in plan view in the middle portion of Fig. 1.

The mechanism which next carries it backward is shown in Fig. 15, and consists of an angle-bar, X, the short arm of which extends upward through the bed of the machine, and is connected to the body of the anvil $t$, so as to move with it. The long arm of said angle-bar extends rearward under the bed of the machine, and has its rear end curved upward and hooked around the shaft F. Y is an oscillating or swinging bar, the lower end of which is hinged to the frame of the machine, and the upper end is pinned or hinged to the curved end of the angle-bar X. A pin on the cam R (indicated by the small broken circle in Fig. 16) acts upon the inside of the curved end of the bar X, to pull it and the anvil $t$ to their most rearward position. A spring, 11, acts to force the bar X and anvil $t$ forward whenever released by the mechanisms for forcing said anvil to the rear. This bar X and its trip-pin are upon one side of the cam R, while the lever W and its trip-pin, for operating the punch $x$, are upon the opposite side of said cam. Just back of the punch $x$ in the frame V there is a vertically-moving hammer, $z$. (See Fig. 17.) In the frame V there is a shaft, 18, having an arm, 19, which enters a mortise in the back of the hammer $z$, at its upper end. A lever, Z, is also connected to said shaft, which lever extends rearward and engages the cam 21 on shaft F, which trips the lever Z, rocks the shaft 18, and depresses the arm 19 and hammer $z$. Just back of the hammers $s\, s$ and anvils $u\, u$ there is a bar, 22, which extends transversely across the bed of the machine, and with its upper surface flush with the bed over which the blank moves between the hammers and anvils. This bar is reciprocated by means of a grooved cam, 23, on shaft E, said cam being grooved concentrically at two points, so as to give the bar a short rest at each end of its reciprocating movement, as shown by the front elevation of said cam in Fig. 12. Said bar has its upper surface cut away, and is beveled so as to slope toward the rear at two points, 24 24, so arranged relatively to the length of the bar and groove in the cam that when said bar is moved farthest toward one side of the machine one of said beveled portions is under the path of one of the hammers $r$, as shown in Fig. 11, and when moved farthest to the opposite side of the machine, then the other beveled portion is under the path of the other hammer $r$.

Figure 14:
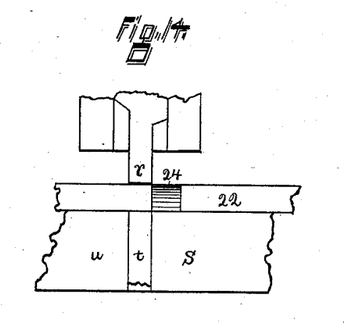
Fig. 14 is a like view of the same parts in their next successive position, which brings the nut under the vertically-moving hammer for swaging it flatwise.

After the next blank is punched the hammer $r$ falls back against the concentric portion 16 of cam R, and simultaneously therewith the pin upon one side of cam R engages the curved end of bar X to draw anvil $t$ rearward, said hammer and anvil moving back together into the position represented in Fig. 14, thereby depositing the blank upon the top of the bar 22, which bar is directly underneath the end of the vertically-moving hammer $z$, and forms an anvil upon which the nut is hammered. The hammer is then depressed, by means of the lever Z and cam 21, to hammer the nut flatwise. Immediately after the action of the vertical hammer $z$ the bar 22 moves to bring the beveled portion 24 under the nut, when it slides off the bar and through the hole 25, Fig. 15, in the bed of the machine, the slope of the bevel 24 on bar 22 being indicated in said figure by the oblique broken lines.

I have herein followed but one nut through the machine, as the machine is the same upon both sides, but so geared that the different sides act alternately.

Figure 19:
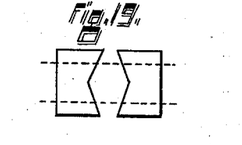
Fig. 19 is a face view of a die for cutting hexagonal nuts from a bar of metal.

I have so far described the machine as for making square nuts; but it is evident that nuts of other forms may be made with this machine by making only formal changes. In Fig. 19 I have shown a die which may be set in the heads for making hexagonal nuts. This die has four cutting-edges, each of which is longer that the sides of the nut to be cut, so that said cutting-edges substantially inclose a rhombic figure. The punch is made of corresponding form. The broken lines in said figure represent a bar of the proper width and placed in proper position in front of said die, so that if cut by the four-cutting side of said die a hexagonal blank would be produced.

I am aware that rotating rollers bearing cutting-dies or shears rigidly fixed to both rollers are old for cutting nut-blanks, and I hereby disclaim the same.

The parts herein shown and described for operating upon the blank after it leaves the conveying-tongs are old when separately considered, but are herein described and claimed in combination with other parts, the whole going to make up an organized machine for making nuts from a bar of iron.

I am aware that continuously-rotating heads bearing fixed blanking-out dies meshing slightly into each other, something like gear, are old for blanking out nuts; also, that a punch for partially forming the central hole in a nut-blank has been so located in a stationary die in the frame of a machine that its outer end was a distance from the cutting-edge of the die less than the thickness of the blank to be cut; also, that intermittingly-rotating heads and mechanism for locking them in place between each intermittent motion are old in various machinery; also, that tongs, nippers, &c., have been made to rock or swing and open and close in various machinery, all of which prior devices are hereby disclaimed.

I claim as my invention—

1. The combination of the heads A A, set edge to edge, suitable gearing to necessitate the simultaneous movement of said heads, blanking-out cutters set radially therein, ratchet-wheel C, the spring-pawl, and mechanism for reciprocating said pawl, substantially as described, and for the purpose specified.

2. The heads A A, bearing blanking-out dies, in combination with suitable gearing to necessitate their simultaneous movement, mechanism for moving the heads with an intermittent motion, and conveying-tongs operated while the heads are at rest, substantially as described, and for the purpose specified.

3. The heads A A, set edge to edge and moving with an intermittent motion, the punches or cutters guided radially therein and bearing the upward-projecting pins, in combination with the oscillating caps G G, having groove $e$, substantially as described, and for the purpose specified.

4. The heads A A, bearing blanking-out cutters, in combination with holding-punches guided radially therein in the path of the blank as cut off by said cutters, and the oscillating caps G G, bearing cam $h$, for acting on the upward projection or pin in said holding-punches, substantially as described, and for the purpose specified.

5. The heads A A, bearing blanking-out cutters and moving with an intermittent motion, in combination with the holding-punches $g$, guided radially therein, the oscillating caps G G, bearing groove $e$, and cam $h$, substantially as described, and for the purpose specified.

6. The intermittingly-rotating heads A A, bearing dies $c$, in combination with holding-punches, which, when forced inward to their full extent, have their outer ends a distance from the cutting-edge of the dies less than the thickness of the blank to be cut, whereby the blank is forced upon the end of the holding-punch, for holding the blank within the dies as they pass on with the heads to the proper point for being discharged, substantially as described, and for the purpose specified.

7. The intermittingly-rotating heads A A, bearing blanking-out cutters, in combination with mechanism for driving one of said heads, suitable connecting-gearing for necessitating a simultaneous and positive movement to both heads by merely imparting motion to one of them, and the locking-pins $p\ p$, with their operating mechanism, for positively locking and unlocking the heads at the proper point between each intermittent movement, substantially as described, and for the purpose specified.

8. The combination of the heads A A, bearing blanking-out cutters and mounted on suitable shafts, gears B B, ratchet-wheel C, reciprocating bar $a$, carrying spring-pawl, the cam D, and spring $b$, substantially as described, and for the purpose specified.

9. The heads A A, bearing blanking-out cutters and moving together intermittingly, in combination with the caps G G, pitman H, bars I J, cam K, and spring $j$, substantially as described, and for the purpose specified.

10. The combination of the heads A A, bearing blanking-out cutters and mounted on suitable shafts, gears B B, ratchet-wheel C, reciprocating bar $a$, carrying spring-pawl, the cam D, spring $b$, shaft E, cam K, bar J, spring $j$, bar I, pitman H, and caps G G, substantially as described, and for the purpose specified.

11. The conveying-tongs $n$, mounted on an axis perpendicular to the bed of the machine, in combination with mechanism for swinging them on said axis to present their outer ends to different mechanisms over said bed, and mechanism for opening and closing them when at rest at the end of each swinging movement, substantially as described, and for the purpose specified.

12. The conveying-tongs $n$, having a swinging movement on an axis perpendicular to the bed of the machine, in combination with mechanism for turning the arms of said tongs on their horizontal axis from a horizontal position at one end of their swinging movement to a vertical position at the other end of said movement, and vice versa, substantially as described, and for the purpose specified.

13. The combination of the hollow arm $m$, the slide 3, having a longitudinal movement thereon, the blocks 1 2 on said arm, and one of which is secured to the end of slide 3, the tongs $n$, pivoted to the block 2, and having oblique slots, which receive pins or projections on the block 1, substantially as described, and for the purpose specified.

14. The combination of the tongs $n$, blocks 1 2, hollow shaft L, hollow transverse arm $m$, slide 3, having a mortise at one end, and vertically-moving slide having oblique tenon working in said mortise, all substantially as described, and for the purpose specified.

15. The tongs $n$, blocks 1 2, hollow shaft L, arm $m$, slides 3 and $o$, in combination with the lever N, connected to the slide $o$, and the cam O, all substantially as described, and for the purpose specified.

16. The combination of the tongs $n$, blocks 1 2, shaft L, arm $m$, slides 3 and $o$, lever N, cam O, shaft E, cam M, rack $l$, and gear $k$ on said shaft L, all substantially as described, and for the purpose specified.

17. The tongs $n$, mounted to turn loosely on a horizontal axis and to be swung around a vertical axis, as described, in combination with the trips 7 and 8, located in the path of their swinging movement, substantially as described, and for the purpose specified.

18. The heads A A, bearing blanking-out dies and moving with an intermittent motion, in combination with the conveying-tongs and the mechanism to carry them from and to the edge of said heads, substantially as described, and for the purpose specified.

19. The heads A A, bearing blanking-out dies, the holding-punch $g$, arranged to slightly enter the blank cut by said dies, mechanism for projecting said holding-punch with a blank thereon from the dies, conveying-tongs, and mechanism to present them, when open, to the blank on the holding-punch, substantially as described, and for the purpose specified.

20. The combination of the intermittingly-rotating heads bearing blanking-out dies, every alternate one of which is designed to receive a blank, the two pairs of conveying-tongs, and mechanism for presenting them alternately to the heads, substantially as described, and for the purpose specified.

21. The conveying-tongs having a swinging movement, in combination with the movable and stationary anvils $u\ t$, hammers $r\ s$, punch $x$, vertical hammer $z$, and mechanism for operating said hammers and punches, substantially as described, and for the purpose specified.

22. The movable and stationary anvils $u\ t$, hammers $r\ s$, punch $x$, vertical hammer $z$, and mechanism for operating said hammers and punch, in combination with the transferring-tongs and intermittingly-rotating heads bearing blanking-out dies, substantially as described, and for the purpose specified.

23. The combination of the conveying-tongs $n$, shaft L, gear $k$, rack N, cam O, shafts E F, cam T, bar S, movable anvil $t$, hammer $r$, cam R, and the die 8, substantially as described, and for the purpose specified.

24. The combination of the intermittingly-rotating heads having blanking-out dies, the two pairs of swinging conveying-tongs, and two sets of hammering and punching mechanism, substantially as described, and for the purpose specified.

25. The heads A A, set edge to edge, in combination with mechanism for imparting an intermittingly-rotating motion to said heads, blanking-out cutters with one member thereof mounted in radial guides in said heads, and mechanism for projecting the moving member of said blanking-out cutter at a time when the intermittingly-moving heads are at rest between each intermittent movement, substantially as described, and for the purpose specified.

GEORGE DUNHAM.

Witnesses:
FREDERICK A. GOODWIN,
CARLOS L. MASON.